(12) United States Patent
Lee

(10) Patent No.: US 9,327,796 B2
(45) Date of Patent: May 3, 2016

(54) SCOOTER HAVING POSITION RECOVERY AND SHOCK-ABSORBING FUNCTIONS

(75) Inventor: Kook Hwan Lee, Seoul (KR)

(73) Assignees: Kook Hwan Lee, Seoul (KR); GREENTRACK. CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/394,101

(22) PCT Filed: Apr. 23, 2012

(86) PCT No.: PCT/KR2012/003105
§ 371 (c)(1),
(2), (4) Date: Oct. 13, 2014

(87) PCT Pub. No.: WO2013/162081
PCT Pub. Date: Oct. 31, 2013

(65) Prior Publication Data
US 2015/0137469 A1 May 21, 2015

(51) Int. Cl.
*B62K 3/00* (2006.01)
*B62K 1/00* (2006.01)
*B62K 25/04* (2006.01)
*B62M 1/00* (2010.01)

(52) U.S. Cl.
CPC ............... *B62K 25/04* (2013.01); *B62K 3/002* (2013.01); *B62M 1/00* (2013.01)

(58) Field of Classification Search
CPC .......... A61H 3/04; B62M 1/00; B62M 27/02; B62K 3/002
USPC ................. 280/87.01, 87.021, 87.03, 87.041, 280/87.05; 180/180, 181
See application file for complete search history.

(56) References Cited

U.S. PATENT DOCUMENTS

| 6,619,679 | B2 * | 9/2003 | Lan | 280/87.05 |
| 2001/0030404 | A1 * | 10/2001 | Liu | 280/87.041 |
| 2002/0096848 | A1 * | 7/2002 | Wei et al. | 280/87.041 |
| 2002/0109323 | A1 * | 8/2002 | Darnell | 280/87.041 |
| 2003/0221887 | A1 * | 12/2003 | Hsu | 180/180 |
| 2004/0129471 | A1 * | 7/2004 | Cheng | 180/181 |
| 2004/0227317 | A1 * | 11/2004 | Cheng | 280/87.041 |
| 2008/0174087 | A1 | 7/2008 | Cowperthwaite | |

FOREIGN PATENT DOCUMENTS

| JP | 2001-276295 A | 10/2001 |
| KR | 20-0202938 Y1 | 11/2000 |
| KR | 10-2001-0036533 A | 5/2001 |
| KR | 20-0332074 Y1 | 11/2003 |

* cited by examiner

*Primary Examiner* — Frank Vanaman
(74) *Attorney, Agent, or Firm* — Revolution IP, PLLC

(57) ABSTRACT

A scooter having shock-absorbing members mounted on the front and rear sides of the scooter, thereby allowing a quick recovery when changing directions while riding or when riding over an obstacle on the road, and minimizing an impact transmitted along the road surface during running and a fatigue transmitted to a user even in long term riding.

4 Claims, 4 Drawing Sheets

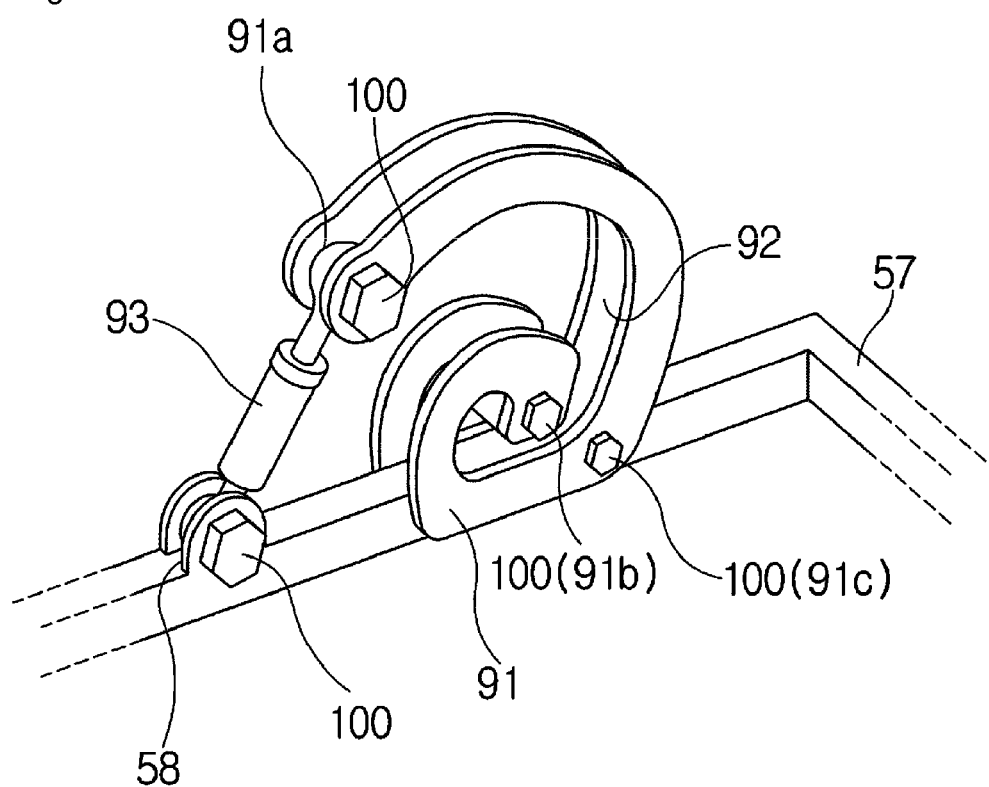

SCOOTER HAVING POSITION RECOVERY AND SHOCK-ABSORBING FUNCTIONS

CROSS REFERENCE TO PRIOR APPLICATIONS

This application is a National Stage Application of PCT International Patent Application No. PCT/KR2012/003105 filed on Apr. 23, 2012, under 35 U.S.C. §371, which is hereby incorporated by reference in its entirety.

TECHNICAL FIELD

The present invention relates to a scooter having position recovery and shock-absorbing functions, and more particularly, to a scooter having position recovery and shock-absorbing functions capable of attenuating a shock while enabling safe running even when the scooter is running or runs over an obstacle on a road surface.

BACKGROUND ART

In general, since a scooter having two rear wheels has stability such that the scooter does not easily fall down to a left or right side in comparison with a bicycle or a two-wheeled scooter, anyone can easily run and ride the scooter. In addition, since a relatively wide carrier section can be provided on an upper section of a rear wheel section, the scooter can be used as an inexpensive means of transportation.

However, since both of the real wheels of such a scooter protrude outward more than a front wheel, the scooter may be more easily turned over than the bicycle or the two-wheeled scooter.

That is, when a driver changes a direction while running or the scooter runs over an obstacle on a road, the three-wheeled scooter may be tilted in a direction in which a centripetal force is applied, and the scooter may not be able to maintain or rapidly return to an equilibrium state of the rear wheel section.

Accordingly, scooters have not been popularized as an inexpensive means of transportation that not only ordinary persons, but also the old and the infirm can easily learn to ride due to the above-mentioned problems.

Accordingly, improvements of forward movement stability and recovery speed of when a center of gravity has moved are urgently required such that drivers can easily drive and stably ride scooters regardless of a running speed of the three-wheeled scooter, a load on the rear wheel section, a road surface state, and so on.

SUMMARY OF INVENTION

Technical Problem

In order to solve these problems, an object of the present invention provides a scooter capable of rapidly recovering a position even when a direction of the scooter is changed or the scooter runs over an obstacle on a rod through shock-absorbing means mounted on front and rear sides.

In addition, another object of the present invention provides a scooter capable of minimizing a shock transmitted along a road surface during running through the shock-absorbing means mounted on the front and rear sides.

Solution to Problem

In order to achieve the aforementioned objects, the present invention provides a scooter having position recovery and shock-absorbing functions, the scooter including: a front wheel on which a steering shaft is mounted in a vertical direction; a front wheel section having a vertical connecting shaft coupled to the steering shaft and a handle mounted on an upper section thereof and configured to perform change of a direction and manipulation; a front coupling shaft having a front coupling section inserted and mounted in a portion at which the steering shaft is coupled to the vertical connecting shaft of the front wheel section, and a front connector having a connecting shaft coupling hole and a shock-absorbing coupling hole formed at one side and a lower end thereof; a footrest section disposed at a rear side of the front wheel section, and having a drive unit mounted on one side thereof, a vertical connecting section and a horizontal connecting section bent at a front side thereof, and a footrest connecting section having a coupling hole bent at a center thereof to be fixed to the connecting shaft coupling hole through a fastener; a shock-absorbing bar inserted and mounted in the shock-absorbing coupling hole of the front coupling shaft and having shock-absorbing connectors formed at both sides thereof at positions corresponding to shock-absorbing connectors formed at both sides of the horizontal connecting section; a front shock-absorbing means configured to recover a position and attenuate a shock using shock-absorbing members having ends fixedly coupled to the shock-absorbing connectors; and rear wheels mounted on both sides of a rear sides of the footrest section.

Advantageous Effects of Invention

According to the present invention, as the shock-absorbing means are mounted on the front and rear sides, the position of the scooter can be rapidly recovered even when the direction of the scooter is changed or the scooter runs over an obstacle on a road while running, and anyone can easily use the scooter regardless of age or sex.

In addition, as the shock-absorbing means are mounted on the front and rear sides, a shock transmitted along the road surface during running can be minimized, and a fatigue transmitted to a user can be minimized even in long term use.

BRIEF DESCRIPTION OF DRAWINGS

FIG. 4 is a perspective view showing a rear shock-absorbing means that constitutes the scooter having position recovery and shock-absorbing functions according to the present invention.

DESCRIPTION OF EMBODIMENTS

Figure 1:
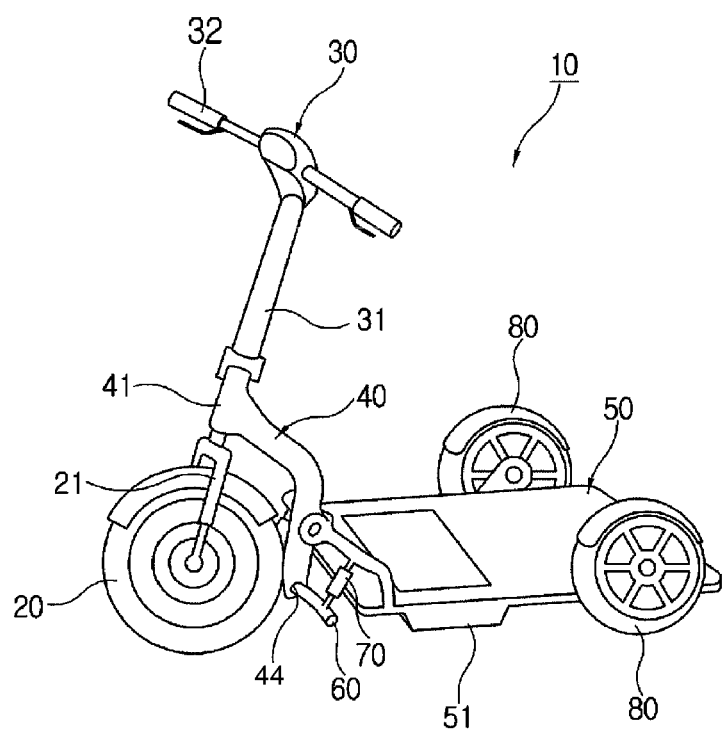
FIG. 1 is a view showing a scooter having position recovery and shock-absorbing functions according to the present invention.
Figure 2:
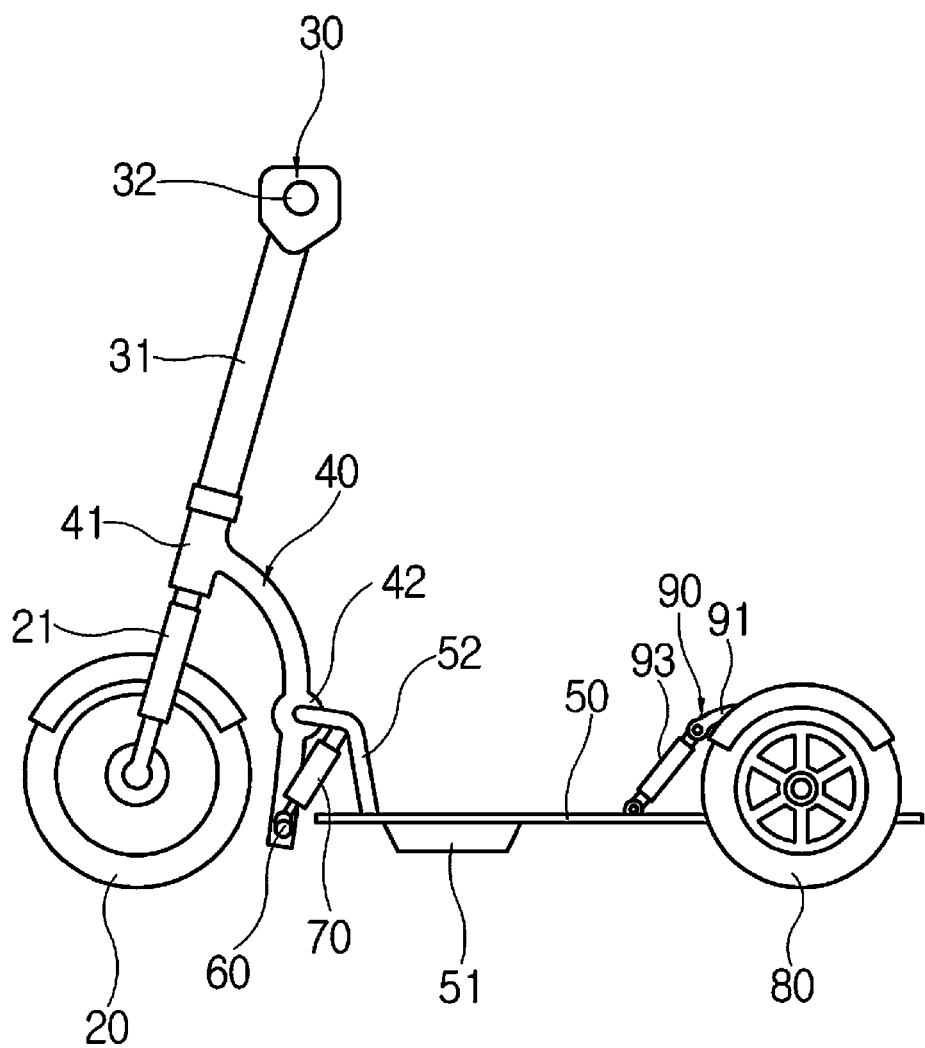
FIG. 2 is a view showing another example of the scooter having position recovery and shock-absorbing functions according to the present invention.
Figure 3:
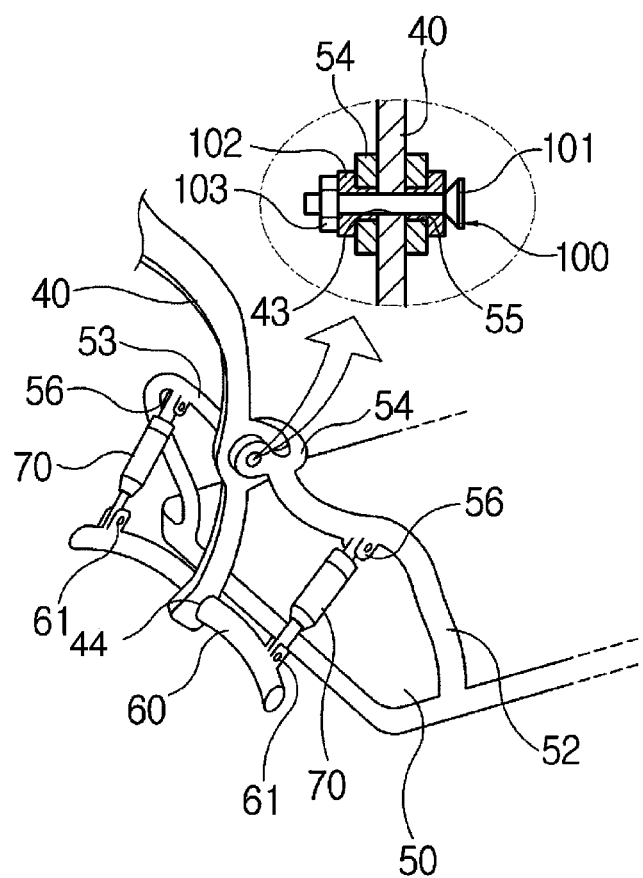
FIG. 3 is a view showing a coupling state of a front coupling shaft, a footrest section, and a shock-absorbing section that constitute the scooter having position recovery and shock-absorbing functions according to the present invention.

Hereinafter, a configuration of the present invention will be described with reference to the accompanying drawings, of which FIG. 1 is a view showing a scooter having position recovery and shock-absorbing functions according to the present invention, FIG. 2 is a view showing another example of the scooter having position recovery and shock-absorbing functions according to the present invention, FIG. 3 is a view showing a coupling state of a front coupling shaft, a footrest section, and a shock-absorbing section that constitute the scooter having position recovery and shock-absorbing functions according to the present invention, and FIG. 4 is a perspective view showing a rear shock-absorbing means that constitutes the scooter having position recovery and shock-absorbing functions according to the present invention.

A scooter 10 having position recovery and shock-absorbing functions according to the present invention includes a front wheel 20 on which a steering shaft 21 is mounted, a front wheel section 30 coupled to the steering shaft 21 and configured to perform change of a direction and manipulation, a front coupling shaft 40 mounted on a portion at which the steering shaft 21 is coupled to a vertical connecting shaft 31 of the front wheel section 30, a footrest section 50 installed at a rear side of the front wheel section 30, a shock-absorbing bar 60 inserted and mounted in a shock-absorbing coupling hole 44 that constitutes the front coupling shaft 40, a front shock-absorbing means 70 having ends coupled to the footrest section 50 and the shock-absorbing bar 60, rear wheels 80 mounted on both sides of the rear side of the footrest section 50, a rear shock-absorbing means 90 mounted on the footrest section 50 at which the rear wheel 80 is disposed, and so on.

The front wheel 20 is formed by selecting one of known front wheels, and separate description thereof will be omitted. The steering shaft 21 is mounted on a center of the front wheel 20 in an upward direction.

The front wheel section 30 has the vertical connecting shaft 31 coupled to an upper section of the steering shaft 21, and a handle 32 mounted on the upper section to perform change of a direction and manipulation.

That is, the front wheel section 30 is coupled to the steering shaft 21 coupled to the front wheel 20 to perform various functions such as change of a direction and so on according to manipulation of the handle 32 by a user.

The front coupling shaft 40 mounted on the portion at which the steering shaft 21 is coupled to the vertical connecting shaft 31 of the front wheel section 30 has a front coupling section 41 inserted and mounted in a portion at which the steering shaft 21 is coupled to the vertical connecting shaft 31, a front connector 42 having a connecting shaft coupling hole 43 formed at one side thereof, and the shock-absorbing coupling hole 44 formed at a lower end thereof.

That is, the front coupling shaft 40 couples the front coupling section 41 to the portion at which the steering shaft 21 is coupled to the vertical connecting shaft 31, couples a footrest connecting section of the footrest section 50 (to be described below) to the connecting shaft coupling hole 43, and couples the shock-absorbing bar 60 to the shock-absorbing coupling hole 44.

Here, the front connector 42 protrudes such that the footrest connecting section of the footrest section 50 can be fixed through a fastener 100 while surrounding the front connector 42.

The footrest section 50 installed at the rear side of the front wheel section 30 has a drive unit 51 mounted on one side thereof, a vertical connecting section 52 and a horizontal connecting section 53 bent at the front side, and a footrest connecting section 54 having a coupling hole 55 and bent at a center of the horizontal connecting section 53.

That is, the footrest section 50 has the footrest connecting section 54 having the coupling hole 55 and that is bent such that the vertical connecting section 52 and the horizontal connecting section 53 are bent upward at the front side to be fixed to the connecting shaft coupling hole 43 through the fastener 100 at the center of the horizontal connecting section 53.

Here, the fastener 100 includes a bolt 101 having a predetermined length, a fastening bush 102 partially inserted into the coupling hole 55, and a fixing nut 103 fastened and fixed to the bolt 101.

In addition, shock-absorbing connectors 56 are symmetrically formed at both sides of the horizontal connecting section 53 to couple the front shock-absorbing means 70 thereto.

The shock-absorbing bar 60 inserted into the shock-absorbing coupling hole 44 that constitutes the front coupling shaft 40 has a predetermined length to be inserted into the shock-absorbing coupling hole 44 of the front coupling shaft 40, and shock-absorbing connectors 61 are symmetrically formed at both sides thereof.

Here, the shock-absorbing connectors 61 are formed at positions corresponding to the shock-absorbing connectors 56 symmetrically formed at both sides of the horizontal connecting section 53.

The front shock-absorbing means 70 having ends fixed to the shock-absorbing connectors 56 and 61 are configured to attenuate a shock while recovering a position during running on the road surface or the ground.

Here, the front shock-absorbing means 70 are coupled to the shock-absorbing connectors 56 and 61 using shock-absorbing members. The shock-absorbing members may be constituted by any one selected from a shock absorber, a spring, a rubber bar, and a connecting wire constituted by a plurality of rubber strings. In the present invention, an example constituted by the shock absorber will be exemplarily described.

The rear wheels 80 mounted on both sides of a rear side of the footrest section 50 are constituted by selecting one of known rear wheels, and separate description thereof will be omitted.

The rear shock-absorbing means 90 mounted on the footrest section 50 at which the rear wheel 80 is disposed includes a pair of fixing plates 91 mounted on a frame 57 that constitutes the footrest section 50 at an interval and having a shock-absorbing connecting hole 91a and a shaft coupling hole 91b formed at both ends and a frame connecting hole 91c formed at one side to be fixed to the frame 57 through the fastener 100, a support 92 mounted between the fixing plate 91 and the fixing plate 91, and a shock-absorbing member 93 coupled to a fixing jig 58 formed at the frame 57 and the shock-absorbing connecting hole 91a of the fixing plate 91.

Here, to describe the fixing plate 91 more specifically, the fixing plate 91 is fixedly coupled to the frame 57 through the frame connecting hole 91c, the shaft coupling hole 91b is formed at a center therein to be coupled to a center of the rear wheel 80 through the fastener 100, and the shock-absorbing connecting hole 91a is formed at an outer end thereof to be coupled to the shock-absorbing member 93.

In addition, the shock-absorbing member 93 of the rear shock-absorbing means 90 is constituted by any one selected from a shock absorber, a spring, a rubber bar, and a connecting wire constituted by a plurality of rubber strings. In the present invention, an example constituted by the shock absorber will be exemplarily described.

The embodiment of the scooter having position recovery and shock-absorbing functions configured as described above will be described with reference to the accompanying drawings.

First, the steering shaft 21 is mounted on the center of the front wheel 20, the vertical connecting shaft 31 is coupled to the steering shaft 21, and then the front wheel section 30 on which the handle 32 is mounted to perform change of a direction and manipulation is mounted on an upper section thereof.

Here, the front connector 42 having the connecting shaft coupling holes 43 formed at one side and a lower end thereof and the front coupling section 41 of the front coupling shaft 40 having the shock-absorbing coupling hole 44 are inserted into the portion at which the steering shaft 21 is coupled to the vertical connecting shaft 31 of the front wheel section 30.

In addition, the drive unit 51 is mounted on one side of the rear side of the front wheel section 30, the vertical connecting section 52 and the horizontal connecting section 53 are bent at the front side, and the footrest connecting section 54 having the coupling hole 55 and the footrest section 50 having the shock-absorbing connectors 56 are mounted on the center and both sides of the horizontal connecting section 53.

That is, after disposing the footrest connecting section 54 having the coupling hole 55 at the front connector 42, the fastening bushes 102 are mounted on both sides of the coupling hole 55, the bolt 101 passes through the connecting shaft coupling hole 43 and the coupling hole 55, and then the bolt 101 is fixedly fastened using the fixing nut 103.

Next, the shock-absorbing connectors 56 formed at both sides of the horizontal connecting section 53 and the shock-absorbing bars 60 having the shock-absorbing connectors 61 formed at corresponding positions are inserted and mounted in the shock-absorbing coupling hole 44 of the front coupling shaft 40.

Then, when the rear wheels 80 mounted on both sides of the rear side of the footrest section 50 are mounted on the shock-absorbing connectors 56 and 61 after fixing the shock absorbers of the front shock-absorbing means 70 to the ends thereof, assembly of the scooter 10 having position recovery and shock-absorbing functions is terminated.

Here, the rear shock-absorbing means 90 includes the pair of fixing plates 91 mounted on the frame 57 that constitutes the footrest section 50 at an interval and having the shock-absorbing connecting hole 91*a* and the shaft coupling hole 91*b* formed at both ends and the frame connecting hole 91*c* formed at one side to be fixedly mounted on the frame 57 through the fastener 100, the support 92 mounted between the fixing plate 91 and the fixing plate 91, and the shock-absorbing member 93 coupled to the fixing jig 58 formed at the frame 57 and the shock-absorbing connecting hole 91*a* of the fixing plate 91.

Here, an assembly sequence of the scooter having position recovery and shock-absorbing functions may be configured differently from the above-mentioned description.

In this state, the case in which the scooter 10 having position recovery and shock-absorbing functions is used is as follows.

First, the scooter 10 having position recovery and shock-absorbing functions performs various functions in addition to change of direction while running using the handle 32 mounted on the front wheel section 30 and other additional devices.

Here, in the scooter 10 having position recovery and shock-absorbing functions, the shock absorbers of the shock-absorbing means 70 and 90 mounted on the front and rear sides can absorb the shock transmitted from the road surface to minimize transmission of the shock.

In addition, when the scooter 10 having position recovery and shock-absorbing functions changes a direction or runs over an obstacle while tilted, the scooter 10 can rapidly recover the position and attenuate the shock through the shock-absorbing means 70 and 90.

That is, the shock-absorbing members of the shock-absorbing means 70 and 90 can attenuate the shock and recover the position by closely attaching the tilted portion to the ground in a maximally rapid manner while the shock absorber moves forward as the applied force is weakened.

Embodiments of the invention have been discussed above with reference to the accompanying drawings. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the embodiments described and shown above. That is, there are numerous modifications and variations of the invention that are too numerous to be listed but that all fit within the scope of the invention.

The invention claimed is:

1. A scooter having position recovery and shock-absorbing functions, the scooter comprising:
   a front wheel on which a steering shaft is mounted in a vertical direction;
   a front wheel section having a vertical connecting shaft and a handle mounted on an upper section of the vertical connecting shaft and configured to perform change of a direction and manipulation;
   a front coupling shaft having a front coupling section, one end of the front coupling section connecting to the vertical connecting shaft and the other end of the front coupling section connecting to the steering shaft and a front connector having a connecting shaft coupling hole and a shock-absorbing coupling hole formed at one side and a lower end of the front connector;
   a footrest section disposed at a rear side of the front wheel section and having a drive unit mounted on one side of the footrest section, a connecting section having a vertical connecting section and a horizontal connecting section which is placed at a front side of the footrest section, and a footrest connecting section located at a center of the horizontal connecting section, the footrest connecting section having a coupling hole which corresponds to the connecting shaft coupling hole, wherein the coupling hole and the connecting shaft coupling hole are fixed via a fastener;
   a shock-absorbing bar inserted and mounted in the shock-absorbing coupling hole of the front coupling shaft and having shock-absorbing connectors formed at both sides of the shock-absorbing bar at positions corresponding to shock-absorbing connectors formed at both sides of the horizontal connecting section;
   a front shock-absorbing means configured to recover a position of the scooter and attenuate a shock using shock-absorbing members having ends fixedly coupled to the shock-absorbing connectors; and
   rear wheels mounted on both sides of a rear side of the footrest section.

2. The scooter having position recovery and shock-absorbing functions according to claim 1, wherein
   a rear shock-absorbing means is mounted on the footrest section, on which the rear wheels are mounted, to be coupled to the rear wheels and is configured to recover the position of the scooter while attenuating the shock transmitted along a road surface, and the rear shock-absorbing means comprises a pair of fixing plates mounted on the frame that constitutes the footrest section at an interval and one end of the fixing plates having a shock-absorbing connecting hole and the other end of the fixing plates having a shaft coupling hole and a frame connecting hole formed at one side to be fixedly mounted on the frame through the fastener, a support mounted between the pair of fixing plates, and a shock-absorbing member coupled to a fixing jig formed at the frame and the shock-absorbing connecting hole of the fixing plates.

3. The scooter having position recovery and shock-absorbing functions according to claim 1, wherein the shock-absorbing member of each of the shock-absorbing means is constituted by any one selected from a shock absorber, a spring, a rubber bar, and a connecting wire constituted by a plurality of rubber strings.

4. The scooter having position recovery and shock-absorbing functions according to claim 2, wherein the shock-absorbing member of each of the shock-absorbing means is constituted by any one selected from a shock absorber, a spring, a rubber bar, and a connecting wire constituted by a plurality of rubber strings.

* * * * *